United States Patent

Shetty et al.

(10) Patent No.: US 9,007,907 B1
(45) Date of Patent: Apr. 14, 2015

(54) METHOD AND SYSTEM OF REVERSE-LINK TRANSMISSION

(75) Inventors: Manoj Shetty, Overland Park, KS (US); Sachin R. Vargantwar, Overland Park, KS (US); Siddharth S. Oroskar, Overland Park, KS (US); Bhagwan Khanka, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 886 days.

(21) Appl. No.: 12/548,248

(22) Filed: Aug. 26, 2009

(51) Int. Cl.
*H04L 12/26* (2006.01)
*H04W 4/00* (2009.01)
*H04L 12/851* (2013.01)

(52) U.S. Cl.
CPC .................................. *H04L 47/2441* (2013.01)

(58) Field of Classification Search
USPC ......... 370/391, 332, 235, 252, 335, 468, 230; 455/522, 127.1
See application file for complete search history.

(56) References Cited

U.S. PATENT DOCUMENTS

| | | | | |
|---|---|---|---|---|
| 5,857,147 A * | 1/1999 | Gardner et al. | ............ | 455/67.11 |
| 6,563,810 B1 * | 5/2003 | Corazza | ......... | 370/335 |
| 6,741,862 B2 * | 5/2004 | Chung et al. | ............... | 455/452.1 |
| 7,072,630 B2 * | 7/2006 | Lott et al. | ................... | 455/151.2 |
| 7,324,448 B2 * | 1/2008 | Lee et al. | ....................... | 370/232 |
| 7,369,501 B2 * | 5/2008 | Kim et al. | ..................... | 370/235 |
| 7,406,077 B2 * | 7/2008 | Balasubramanian et al. | | 370/391 |
| 7,649,839 B2 * | 1/2010 | Dendy | ........................... | 370/230 |
| 2002/0136286 A1 * | 9/2002 | Koo | ................. | 375/225 |
| 2002/0181410 A1 * | 12/2002 | Bae et al. | ...................... | 370/252 |
| 2003/0073443 A1 * | 4/2003 | Bae et al. | ...................... | 455/450 |
| 2003/0093364 A1 * | 5/2003 | Bae et al. | ...................... | 705/37 |
| 2003/0124988 A1 * | 7/2003 | Bae et al. | ......................... | 455/88 |
| 2003/0218997 A1 * | 11/2003 | Lohtia et al. | .................. | 370/335 |
| 2004/0120287 A1 * | 6/2004 | Lott et al. | ..................... | 370/332 |
| 2004/0176042 A1 * | 9/2004 | Lott et al. | ................... | 455/67.11 |
| 2004/0202136 A1 * | 10/2004 | Attar et al. | .................... | 370/333 |
| 2004/0213182 A1 * | 10/2004 | Huh et al. | ..................... | 370/332 |
| 2006/0221883 A1 * | 10/2006 | Damnjanovic et al. | ........ | 370/315 |
| 2007/0002795 A1 * | 1/2007 | Bi et al. | ........................ | 370/329 |
| 2009/0103507 A1 * | 4/2009 | Gu et al. | ........................ | 370/342 |
| 2010/0167780 A1 * | 7/2010 | Lott et al. | ...................... | 455/522 |
| 2010/0178907 A1 * | 7/2010 | Oroskar et al. | ............... | 455/418 |

* cited by examiner

*Primary Examiner* — Steven H Nguyen (57) ABSTRACT

An access terminal in a coverage area of an access network may be monitoring a level of loading on the coverage area's reverse link, such as by monitoring a series of reverse activity bits sent by the access network. The access terminal may then detect new data for transmission to the access network and responsively select a reverse-link data rate based on the monitored level of loading. In this respect, the access terminal may select (a) a first data rate (e.g., a reverse-link data rate at which the access terminal last transmitted data) if the access terminal detects a low load, and (b) a second data rate (e.g., a minimum available reverse-link data rate) if the access terminal detects a high load, where the second data rate is lower than the first data rate. The access terminal may also consider its location in selecting the reverse-link data rate.

18 Claims, 4 Drawing Sheets

METHOD AND SYSTEM OF REVERSE-LINK TRANSMISSION

BACKGROUND

In a typical cellular wireless network, an area is divided geographically into a number of coverage areas, such as cells and sectors, each defined by a radio frequency (RF) radiation pattern from a respective base transceiver station (BTS). Within each coverage area, the BTS's RF radiation pattern provides an air interface over which mobile stations (such as cellular telephones, personal digital assistants (PDAs), and wirelessly-equipped personal computers) may communicate with the cellular wireless network. In turn, the cellular wireless network may communicate with one or more other networks, such as the public switched telephone network (PSTN) or the Internet. As such, when a mobile station is positioned within a coverage area of the cellular wireless network, the mobile station can communicate with entities on the other networks via the cellular wireless network.

The RF air interfaces may carry communications between mobile stations and the cellular wireless network according to any of a variety of protocols. Depending on the protocol employed, the RF air interface of each coverage area in the cellular wireless network may be divided into a plurality of channels for carrying communications between mobile stations and the cellular wireless network. For example, the RF air interface may include a plurality of forward-link channels, such as pilot channels, sync channels, paging channels, control channels, and forward-traffic channels, for carrying communications from the cellular wireless network to the mobile stations. As another example, the RF air interface may include a plurality of reverse-link channels, such as access channels and reverse-traffic channels, for carrying communications from the mobile stations to the cellular wireless network. In some configurations, the cellular wireless network may monitor loading on a given coverage area's reverse link and then provide an indication of this loading to mobile stations in the given coverage area.

Typically, a mobile station begins transmitting new data at a minimum available reverse-link data rate (i.e., a minimum reverse-link data rate supported by the protocol being employed). Thereafter, a mobile station may adjust its reverse-link data rate based on the loading on the given coverage area's reverse link, as indicated by the cellular wireless network. In particular, if the mobile station detects an indication of a lower load on the given coverage area's reverse link, the mobile station may increase its reverse-link data rate (assuming the mobile station is not transmitting at a maximum available reverse-link data rate). If the mobile station detects an indication of a higher load on the given coverage area's reverse link, the mobile station may decrease its reverse-link data rate (assuming the mobile station is not transmitting at a minimum available reverse-link data rate). The mobile station may continue adjusting its reverse-link data rate in this manner until it finishes sending the data, after which the mobile station may reset its reverse-link data rate to the minimum available reverse-link data rate.

OVERVIEW

One current drawback to the above process for transmitting data to the access network is that the access terminal's overall reverse-link transmission data rate may be unnecessarily decreased. In particular, by automatically beginning each new data transmission at a minimum available reverse-link data rate, an access terminal could begin transmitting the new data at a lower rate than the reverse link could otherwise support. This is especially the case when the access terminal has remained in the same wireless coverage area and the RF conditions of the coverage area's reverse link have remained relatively static.

Disclosed herein is an improved process for transmitting data to an access network. According to an exemplary method, an access terminal in a given coverage area will not automatically begin transmitting new data at a minimum available reverse-link data rate. Instead, an access terminal will begin transmitting new data to the access network at a reverse-link data rate selected based on a level of loading of the given coverage area's reverse link and perhaps a location of the access terminal. In this respect, the access terminal may be able to improve the overall reverse-link data rate, especially when the given coverage area's reverse link has exhibited a lower level of loading prior to transmission and/or the access terminal has remained in the same general location.

A first method of transmitting data to the access network may include the access terminal (a) monitoring a level of loading on a reverse link of the given coverage area, (b) detecting new data for transmission to the access network, (c) in response to detecting the new data, selecting a reverse-link data rate based on the monitored level of loading, and (d) beginning to transmit the new data to the access network at the selected reverse-link data rate.

In one aspect of the first method, the access terminal monitoring the level of loading on the reverse link of the given coverage area may include the access terminal monitoring a series of reverse activity bits (RABs) received from the access network. In this respect, in one example, the access terminal selecting a reverse-link data rate based on the monitored level of loading may include (a) the access terminal determining an average of a series of RABs received during a given time window (e.g., a last 16 forward-link timeslots received by the access terminal before detecting new data for transmission to the access network), and (b) if the determined average is less than a threshold value (e.g., 0.5), the access terminal selecting a first data rate (e.g., a reverse-link data rate at which the access terminal last transmitted data); otherwise, the access terminal selecting a second data rate (e.g., a minimum available reverse-link data rate), where the second data rate is lower than the first data rate.

A second method of transmitting data to the access network may include the access terminal (a) monitoring a level of loading on a reverse link of the given coverage area, (b) detecting new data for transmission to the access network, (c) in response to detecting the new data, selecting a reverse-link data rate based on the monitored level of loading and a location of the access terminal, and (d) beginning to transmit the new data to the access network at the selected reverse-link data rate.

In one aspect of the second method, the access terminal monitoring the level of loading on the reverse link of the given coverage area may include the access terminal monitoring a series of RABs received from the access network. In this respect, in one example, the access terminal selecting a reverse-link data rate based on the monitored level of loading may include (a) the access terminal determining an average of a series of RABs received during a given time window (e.g., a last 16 forward-link timeslots received by the access terminal before detecting new data for transmission to the access network), (b) the access terminal comparing a current location of the access terminal and a previous location of the access terminal, and (c) if the determined average is less than a threshold value (e.g., 0.5) and the current location is less than a predefined distance (e.g., 50 meters) from the previous location, the access terminal selecting a first data rate (e.g., a reverse-link data rate at which the access terminal last transmitted data); otherwise, the access terminal selecting a second data rate (e.g., a minimum available reverse-link data rate), where the second data rate is lower than the first data rate.

The methods described herein may include other functions as well. For example, the methods may further include the access terminal storing an indication of the monitored level of loading. As another example, the methods may further include the access terminal adjusting a reverse-link data rate at which the access terminal is transmitting the new data to the access network. As yet another example, the methods may include the access terminal completing transmission of the new data and then storing a data rate and/or location from which the access terminal last transmitted the new data.

Also disclosed herein is an access terminal that includes (a) a communication interface for communicating with an access network, (b) a processor, (c) data storage that includes a data buffer arranged to contain data for transmission to the access network, and (d) program instructions stored in the data storage and executable by the processor for carrying out the functions described herein.

These as well as other aspects and advantages will become apparent to those of ordinary skill in the art by reading the following detailed description, with reference where appropriate to the accompanying drawings.

DETAILED DESCRIPTION

Figure 1:
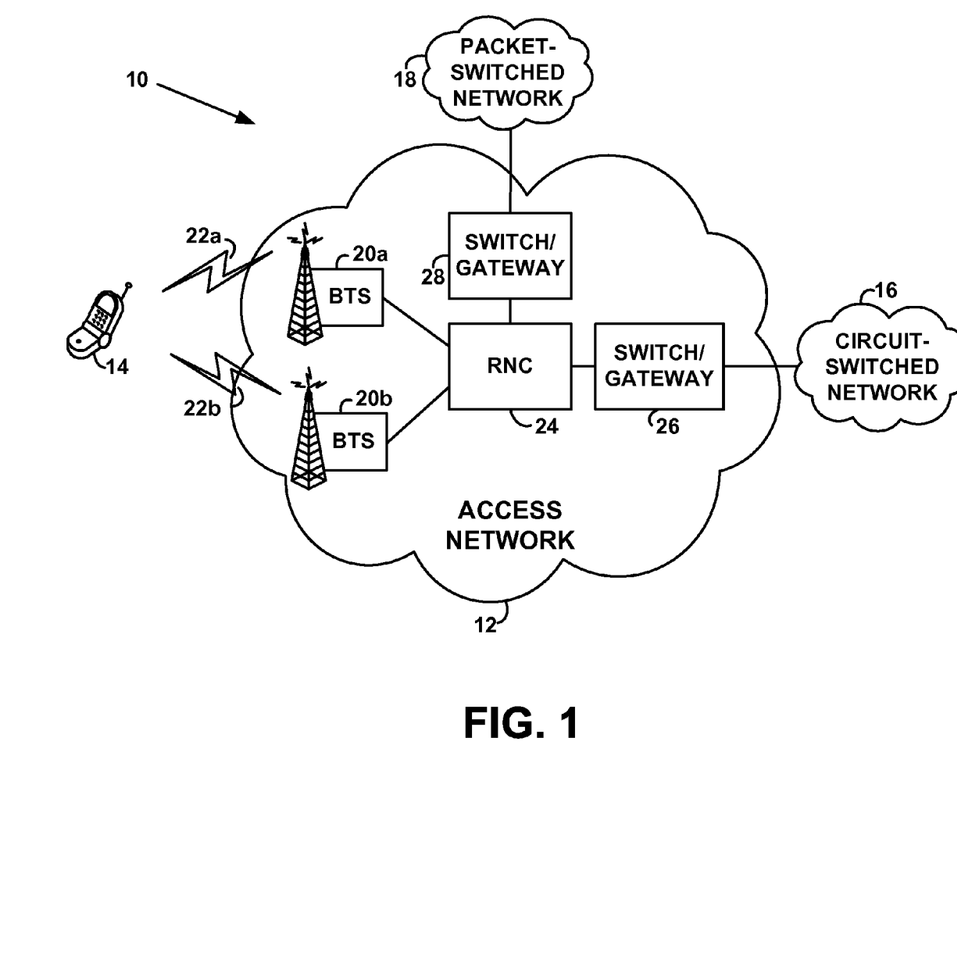
FIG. 1 is a simplified block diagram of a communication system in which an exemplary method can be implemented.

Referring to the drawings, FIG. 1 is a simplified block diagram of a communications system 10 in which an exemplary method can be implemented. As shown, the system 10 includes an access network 12, which may function to provide connectivity between an access terminal 14, such as a cell phone, PDA, or other wirelessly-equipped device, and one or more transport networks, such as a circuit-switched network 16 (e.g., the PSTN) or a packet-switched network (e.g., the Internet) 18.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

As shown, the access network 12 may include a plurality of BTSs 20, such as a first BTS 20a and a second BTS 20b. (Although FIG. 1 depicts the access network 12 as including two BTSs, it should be understood that the access network 12 may include more than two BTSs). The BTSs 20 may each function to transmit RF-radiation patterns at one or more carrier frequencies, and the RF-radiation patterns may then provide one or more air interfaces 22 over which an access terminal 14 may communicate with the access network 12. For example, each BTS 20 may transmit omni-directional RF-radiation patterns that provide a single air interface 22. Alternatively, each BTS 20 may transmit directional RF-radiation patterns that provide multiple air interfaces 22.

Each of the one or more air interfaces 22 of a given BTS 20, such as the first BTS 20a, may define a corresponding wireless coverage area of the first BTS 20a. For example, if the first BTS 20a provides a single air interface 22, then the first BTS 20a may serve a single wireless coverage area (e.g., a cell). Alternatively, if the first BTS 20a provides multiple air interfaces 22, the first BTS 20a may serve multiple wireless coverage areas (e.g., sectors). (Note that if a base station serves a single coverage area, the coverage area is generally referred to as a cell but may also be referred to as a sector.) In either case, each air interface 22 and corresponding wireless coverage area may be defined by the one or more carrier frequencies of the first BTS 20a and/or a pseudo-random number (PN) offset that distinguishes between coverage areas of the first BTS 20a.

Each BTS 20 of the access network 12 may then couple to a radio network controller (RNC) 24, which may function to communicate with each BTS 20 and control aspects of the BTSs 20 as well as aspects of the air-interface communication with the access terminal 14. (Although FIG. 1 depicts the access network 12 as including one RNC 24, it should be understood that the access network 12 may include more than one RNC 24, in which case each RNC 24 may couple to a subset of the BTSs 20 in the access network 12. Further, although the BTSs 20 and the RNC 24 are depicted as separate entities, it should be understood that the RNC 24 and one or more BTSs 20 may be incorporated into a single entity. In this respect, a BTS 20 and the RNC 24 together may be referred to as an "access node.") For example, the RNC 24 may control assignment of air-interface traffic channels to the access terminal 14. As another example, the RNC 24 may control aspects of the access terminal 14 switching between sectors and/or cells of the access network 12. As yet another example, the RNC 24 may facilitate communication between BTSs 20 of the access network 12, such as communication between the first BTS 20a and the second BTS 20b. Other examples are possible as well.

The RNC 24 may then couple to one or more switches or gateways. For example, the RNC 24 may couple to a switch/gateway 26 such as a mobile switching center (MSC), which may provide connectivity with the circuit-switched network 16. As another example, the RNC 24 may couple to a switch/gateway 28 such as a packet data serving node (PDSN), which may provide connectivity with the packet-switched network 18. In this respect, the RNC 24 may additionally include a packet control function (PCF) for controlling packet-data communications. Accordingly, with this general arrangement, the access network 12 may facilitate communications between two access terminals 14 in the access network 12, as well as communications between a given access terminal 14 in the access network 12 and a communication device on the circuit-switched network 16 and/or the packet-switched network 18.

The air interfaces 22 of the BTSs 20 may carry communications between the access network 12 and the access terminal 14 according to any of a variety of protocols. For example, the air interfaces 22 may carry communications according to CDMA (e.g., 1xRTT or 1xEV-DO (IS-856)), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed. Depending on the protocol employed, the air interfaces 22 may also be divided into a plurality of channels for carrying different types of communications between the access terminal 14 and the access network 12. For example, each air interface 22 may include forward-link channels (e.g., control channels, forward-traffic channels, etc.) for carrying forward-link communications from the access network 12 to the access terminal 14, as well as reverse-link channels (e.g., access channels, reverse-traffic channels, etc.) for carrying reverse-link communications from the access terminal 14 to the access network 12.

In a preferred example, the access terminals 14 will communicate with the access network 12 according to an IS-856 protocol, such as IS-856 Rel. 0 or IS-856 Rev. A. According to IS-856 protocols, the forward link may employ time-division multiplexing (TDM) in order to allocate all of a coverage area's forward-link power to a given access terminal 14 at any given moment, while the reverse link may primarily employ code-division multiplexing (CDM). The IS-856 forward link may be divided into timeslots of approximately 1.67 milliseconds (ms), each of which is further time division multiplexed to carry a Forward Pilot channel, a Forward Medium Access Control (MAC) channel that includes a Reverse Activity (RA) channel, a DRCLock channel, a Reverse Power Control (RPC) channel, and an ARQ channel, a Forward Control channel, and a Forward Traffic Channel. The IS-856 reverse link may be code division multiplexed to carry a Reverse Access channel and a Reverse Traffic channel, each of which may be further divided into various sub-channels. Typically, access terminals 14 transmit data over the IS-856 reverse link in 26.67 ms units of time known as frames, which are approximately the same length as 16 forward-link timeslots. Depending on the IS-856 protocol, these frames may be further divided into sub-frames.

On a given coverage area's reverse link, the access network 12 may receive transmissions from multiple access terminals 14 operating on the given coverage area's air interface 22. Additionally, on the given coverage area's reverse link, the access network 12 may receive interfering transmissions from various other sources, such as other wireless devices that are operating on a different coverage area's air interface. These transmissions may combine to represent the reverse-link load, or "reverse noise," on the given coverage area's reverse link.

According to an IS-856 protocol, the access network 12 may measure the reverse noise on a given coverage area's reverse link at regular intervals (e.g., once per forward-link timeslot). The access network 12 may also calculate a difference between the measured reverse noise and a baseline level of reverse noise, which preferably represents an amount of reverse noise when the given coverage area's reverse link is unloaded (i.e. without any transmitting access terminals 14). In one example, the access network 12 may determine the baseline level of reverse noise on the given coverage area's reverse link by employing a silent interval, which is a short timeframe (e.g., a 40-100 ms) during which all access terminals 14 in the system 10 refrain from transmitting to the access network 12. The difference between the measured and baseline reverse noise may be referred to as "reverse noise rise" (RNR).

In general, the lower the RNR is for a given coverage area's reverse link, the lower the load is on that reverse link (i.e., the reverse link is supporting communications for a relatively low number of access terminals 12), and the more favorable the RF conditions are for reverse-link communication between access terminals 14 and the access network 12 in the given coverage area. Correspondingly, the higher the RNR is for a given coverage area's reverse link, the higher the load is on the reverse link (i.e., the reverse link is supporting communications for a relatively high number of access terminals 14), and the less favorable the RF conditions are for reverse-link communication between access terminals 14 and the access network 12 in the given coverage area.

Based on the reverse noise and/or the RNR, the access network 12 may also provide access terminals 14 in the given coverage area with an indication of the loading on the given coverage area's reverse link. For example, according to an IS-856 protocol, the access network 12 may send to the access terminals 14 a reverse activity bit (RAB) for the given wireless coverage area, which is a binary value that indicates a level of loading on the given coverage area's reverse link. Typically, a RAB of 0 indicates a lower load on the given coverage area's reverse link (e.g., RNR is above a given threshold), and a RAB of 1 indicates a higher load on the given coverage area's reverse link (e.g., RNR is below a given threshold). The access network 12 may update and send the RAB at regular intervals (e.g., once per forward-link timeslot on the RA channel of the forward link). As a result, the access network 12 may send, and the access terminals 14 in the given coverage area may receive, a series of RABs that indicate the level of loading on the given coverage area's reverse link.

According to IS-856 Rel. 0, an access terminal 14 in the given coverage area begins transmitting new data at a minimum available reverse-link data rate (i.e., a minimum reverse-link data rate supported by the protocol being employed, which is 9.6 kilobits per second (kbps) in IS-856 Rel. 0). Thereafter, the access terminal 14 may adjust its reverse-link data rate based on the level of loading on the given coverage area's reverse link, as indicated by the RABs received from the access network 12. In particular, if the access terminal 14 detects a RAB that indicates a lower load on the given coverage area's reverse link (RAB=0), the access terminal 14 may increase its reverse-link data rate (assuming the access terminal 14 is not transmitting at the highest available rate). If the access terminal 14 detects a RAB that indicates a higher load on the given coverage area's reverse link (RAB=1), the access terminal 14 may decrease its reverse-link data rate (assuming the access terminal 14 is not transmitting at the minimum available rate). The access terminal 14 may continue adjusting its reverse-link data rate in this manner until it finishes sending the data in the data buffer, after which the access terminal 14 would reset its reverse-link data rate to the minimum available reverse-link data rate.

As described above, one current drawback to this process for transmitting data to the access network 12 is that the access terminal's overall reverse-link transmission data rate may be unnecessarily decreased. In particular, by automatically beginning each new data transmission at a minimum available reverse-link data rate, an access terminal 14 could be transmitting the new data at a lower rate than the reverse link could otherwise support. This is especially the case when the access terminal 14 has remained in the same wireless coverage area and the RF conditions of the coverage area's reverse link have remained relatively static.

Disclosed herein is an improved process for transmitting data to the access network 12. According to an exemplary method, an access terminal 14 in a given coverage area will not automatically begin transmitting new data at a minimum available reverse-link data rate. Instead, an access terminal 14 will begin transmitting new data to the access network 12 at a reverse-link data rate selected based on a level of loading of the given coverage area's reverse link and perhaps a location of the access terminal. In this respect, the access terminal 14 may be able to improve the overall reverse-link data rate, especially when the given coverage area's reverse link has exhibited a lower level of loading prior to transmission and/or the access terminal 14 has remained in the same general location.

Figure 2:
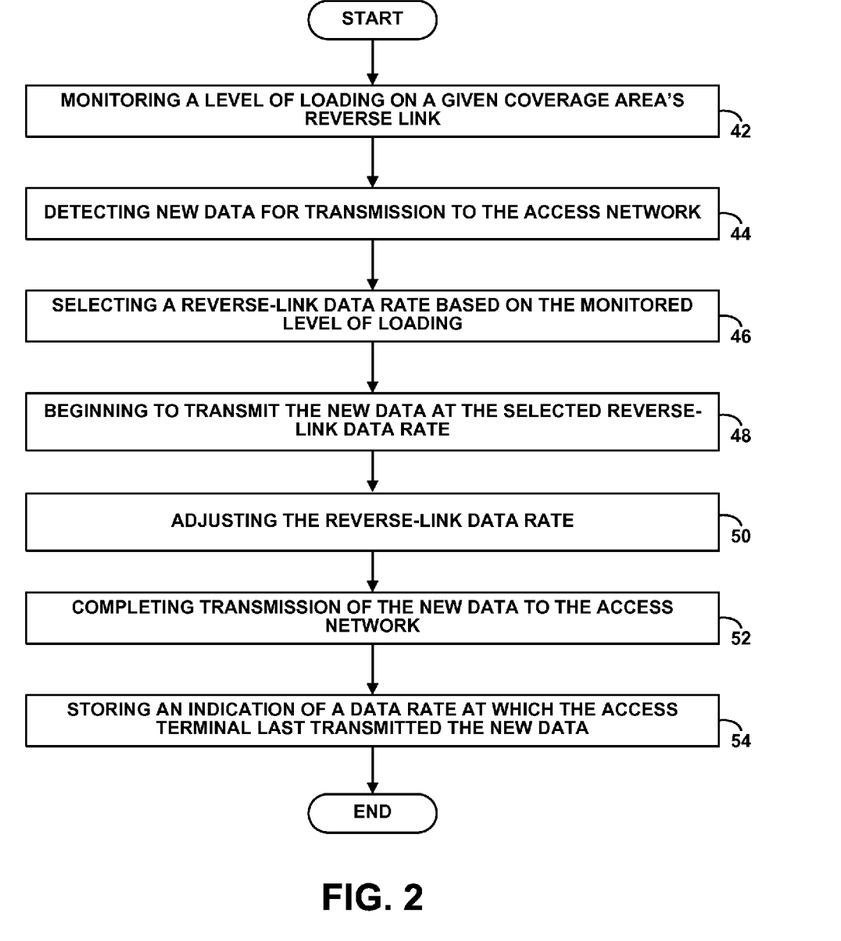
FIG. 2 is a flow chart depicting a first exemplary method of transmitting data to an access network.

FIG. 2 is a flow chart depicting a first exemplary method of transmitting data to the access network 12. The method is preferably carried out by an access terminal 14 in a given coverage area of the access network 12. Further, the method may begin when the access terminal's data buffer is empty, and the access terminal 14 is not transmitting any data to the access network 12.

At step 42, the access terminal 14 may be monitoring a level of loading on a reverse link of the given coverage area. For example, as described above, the access terminal 14 may be monitoring a series of RABs received from the access network 12, where the RABs indicate a level of loading on the given coverage area's reverse link as determined by the access network 12. Additionally, while monitoring the level of loading, the access terminal 14 may be storing an indication of the monitored level of loading, such as an indication of the series of RABs received from the access network 12. For example, the access terminal 14 may store a binary string that corresponds to the series of RABs received from the access network 12. As another example, the access terminal 14 may store a running average of the series of RABs received from the access network 12. As yet another example, the access terminal 14 may store a single binary value to represent the series of RABs received from the access network 12. Other examples are possible as well. The stored indication may represent the monitored level of loading during various different time windows, such as the last 16 forward-link timeslots for instance.

At step 44, the access terminal 14 may detect new data for transmission to the access network 12, such as by detecting new data in its transmit buffer. At step 46, in response to detecting the new data for transmission, the access terminal 14 may select a reverse-link data rate based on the monitored level of loading. In one example, the selected reverse-link data rate may be (a) a first data rate if the access terminal 14 detects a low load on the given coverage area's reverse link and (b) a second data rate if the access terminal 14 detects a high load on the given coverage area's reverse link, where the second rate is lower than the first rate. In this respect, the first data rate may be a reverse-link data rate at which the access terminal 14 last transmitted data, and the second data rate may be a minimum available reverse-link data rate (e.g., 9.6 kbps in IS-856 Rel. 0).

The access terminal 14 may use various techniques for selecting the reverse-link data rate based on the monitored level of loading. In one example, the access terminal 14 may first determine an average of a series of RABs received from the access network 12 during a given time window (e.g., a last 16 forward-link timeslots). If the determined average is less than a threshold value (e.g., 0.5), the access terminal 14 may then select a first data rate; otherwise, the access terminal 14 may select a second data rate. In another example, the access terminal 14 may determine whether a series of RABs received from the access network 12 during a given time window (e.g., a last 8 forward-link timeslots) includes any RABs=1 (high load). If the series of RABs includes zero RABs=1 during the given time window, the access terminal 14 may then select a first data rate; otherwise, the access terminal 14 may select a second data rate. In these examples, the length of the given time window and/or the threshold value may be configurable parameters. Other techniques for selecting the reverse-link data rate based on the monitored level of loading may exist as well.

At step 48, after selecting the reverse-link data rate, the access terminal 14 may begin transmitting the new data to the access network 12 at the selected reverse-link data rate. At step 50, after the access terminal 14 begins transmitting the new data at the selected reverse-link data rate, the access terminal 14 may adjust the reverse-link data rate according to techniques known in the art. For example, according to IS-856 Rel. 0, the access terminal 14 may adjust between available reverse-link data rates (9.6, 19.2, 38.4, 76.8, and 153.6 kbps) based on the access network's RAB stream, a randomly generated integer, and a table of reverse-link transitional probabilities. The table of transitional probabilities typically contains eight probabilities, each expressed as an integer between 0 and 255, that correspond to the eight possible transitions between the five available reverse-link data rates. For example, the table may include probabilities that correspond to upward transitions from (1) 9.6 to 19.2 kbps, (2) 19.2 to 38.4 kbps, (3) 38.4 to 76.8 kbps, and (4) 76.8 to 153.6 kbps. Similarly, the table may include probabilities that correspond to downward transitions from (1) 153.6 to 76.8 kbps, (2) 76.8 to 38.4 kbps, (3) 38.4 to 19.2 kbps, and (4) 19.2 to 9.6 kbps.

While transmitting the new data, if the access terminal 14 checks the series of RABs received from the access network 12 at a given forward-link timeslot and detects a RAB equal to zero (low load), the access terminal 14 may then decide whether to stay at its current reverse-link data rate or transition to the next-higher rate for the next data frame (assuming the access terminal 14 is not transmitting at the highest available rate). In this respect, the access terminal 14 may generate a random integer between 0 and 255 and then compare that random integer with the probability corresponding to the upwards transition being considered. For example, if the access terminal 14 is transmitting its current frame at 9.6 kbps, the access terminal 14 may compare the random integer with the probability that corresponds to the upward transition from 9.6 to 19.2 kbps. If the random integer is less than or equal to the probability corresponding to the upwards transition being considered, the access terminal 14 may transition up to the next-higher rate for the next frame; otherwise, the access terminal 14 may stay at the current rate.

While transmitting the new data, if the access terminal 14 checks the series of RABs received from the access network 12 at a given forward-link timeslot and detects a RAB equal to one (high load), the access terminal 14 may determine whether to stay at the current reverse-link data rate or transition to the next-lower rate for the next data frame (assuming the access terminal 14 is not transmitting at the minimum available rate). In this respect, the access terminal 14 may generate a random integer between 0 and 255 and then compare that random integer with the probability corresponding to the downwards transition being considered. For example, if the access terminal 14 is transmitting its current frame at 19.2 kbps, the access terminal 14 may compare the random integer with the probability that corresponds to the downward transition from 19.2 kbps to 9.6 kbps. If the random integer is less than or equal to the probability corresponding to the downwards transition being considered, the access terminal 14 may transition down to the next-lower rate for the next frame; otherwise, the access terminal 14 may stay at the current rate.

At step 52, the access terminal 14 may complete transmission of the new data to the access network 12. At step 54, in response to completing the transmission, the access terminal 14 may store an indication of a reverse-link data rate at which the access terminal 14 last transmitted the new data (e.g., the data rate at which the access terminal 14 sent the last frame of the new data). The access terminal 14 may then use the stored data rate as the first data rate the next time it selects a reverse-link data rate for transmitting new data.

Figure 3:
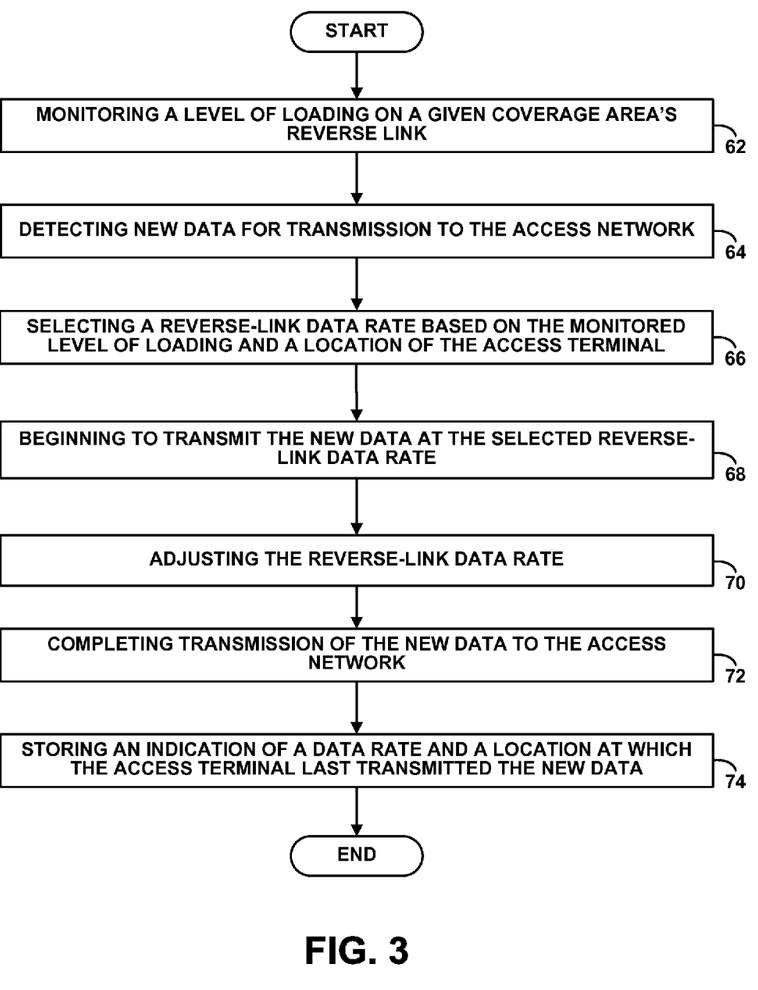
FIG. 3 is a flow chart depicting a second exemplary method of transmitting data to an access network.

FIG. 3 is a flow chart depicting a second exemplary method of transmitting data to the access network 12. As above, the method is preferably carried out by an access terminal 14 in a given coverage area of the access network 12. Further, as above, the method may begin when the access terminal's data buffer is empty, and the access terminal 14 is not transmitting any data to the access network 12.

At step 62, the access terminal 14 may be monitoring a level of loading on a reverse link of the given coverage area, such as by monitoring a series of RABs received from the access network 12. Additionally, while monitoring the level of loading, the access terminal 14 may be storing an indication of the monitored level of loading, such as an indication of the series of RABs received from the access network 12. The stored indication may represent the monitored level of loading during various different time windows, such as the last 16 forward-link timeslots for instance.

At step 64, the access terminal 14 may detect new data for transmission to the access network 12, such as by detecting new data in its transmit buffer. At step 66, in response to detecting the new data for transmission, the access terminal 14 may select a reverse-link data rate based on the monitored level of loading and a location of the access terminal 14. In this respect, the access terminal 14 may determine its location using any technique now know or later developed, including satellite-based methods (e.g., GPS). Further, the access terminal's location may be represented in a variety of forms, including a geographic location of the access terminal 14 and/or a coverage area in which the access terminal 14 is/was located for instance.

In one example, the selected reverse-link data rate may be (a) a first rate if the access terminal 14 detects a low load on the given coverage area's reverse link and the access terminal's location has remained relatively unchanged, and (b) a second rate if the access terminal 14 detects a high load on the given coverage area's reverse link or the access terminal's location has changed, where the second rate is lower than the first rate. In this respect, the first data rate may be a reverse-link data rate at which the access terminal 14 last transmitted data, and the second data rate may be a minimum available reverse-link data rate (e.g., 9.6 kbps in IS-856 Rel. 0).

The access terminal 14 may use various techniques for selecting the reverse-link data rate based on the monitored level of loading and a location of the access terminal 14. In one example, the access terminal 14 may first (a) determine an average of a series of RABs received from the access network 12 during a given time window (e.g., a last 16 forward-link timeslots) and (b) compare the access terminal's current location (e.g., current geographic coordinates) with a previous location (e.g., previous geographic coordinates). If the determined average is less than a threshold value (e.g., 0.5) and the current location is less than a predefined distance (e.g., 50 meters) from the previous location, the access terminal 14 may then select a first data rate; otherwise, the access terminal 14 may select a second data rate. In this example, given time window, the threshold value, and/or the predefined distance may be configurable parameters. Additionally or alternatively, the access terminal 14 may verify that the current and previous locations are within the same coverage area as a condition to selecting the first data rate. Other techniques for selecting the reverse-link data rate based on the monitored level of loading and a location of the access terminal 14 may exist as well.

At step 68, after selecting the reverse-link data rate, the access terminal 14 may begin transmitting the new data to the access network 12 at the selected reverse-link data rate. At step 70, after the access terminal 14 begins transmitting the new data at the selected reverse-link data rate, the access terminal 14 may adjust the reverse-link data rate according to techniques known in the art, including the technique described above with reference to step 50.

At step 72, the access terminal 14 may then complete transmission of the new data to the access network 12. At step 74, in response to completing the transmission, the access terminal 14 may store (a) an indication of a reverse-link data rate at which the access terminal 14 last transmitted the new data (e.g., the data rate at which the access terminal 14 sent the last frame of the new data) and (b) an indication of a location from which the access terminal 14 last transmitted the new data (e.g., the location from which the access terminal 14 sent the last frame of the new data). The access terminal 14 may then use the stored data rate as the first data rate and the stored location as the previous location the next time it selects a reverse-link data rate for transmission of new data.

Figure 4:
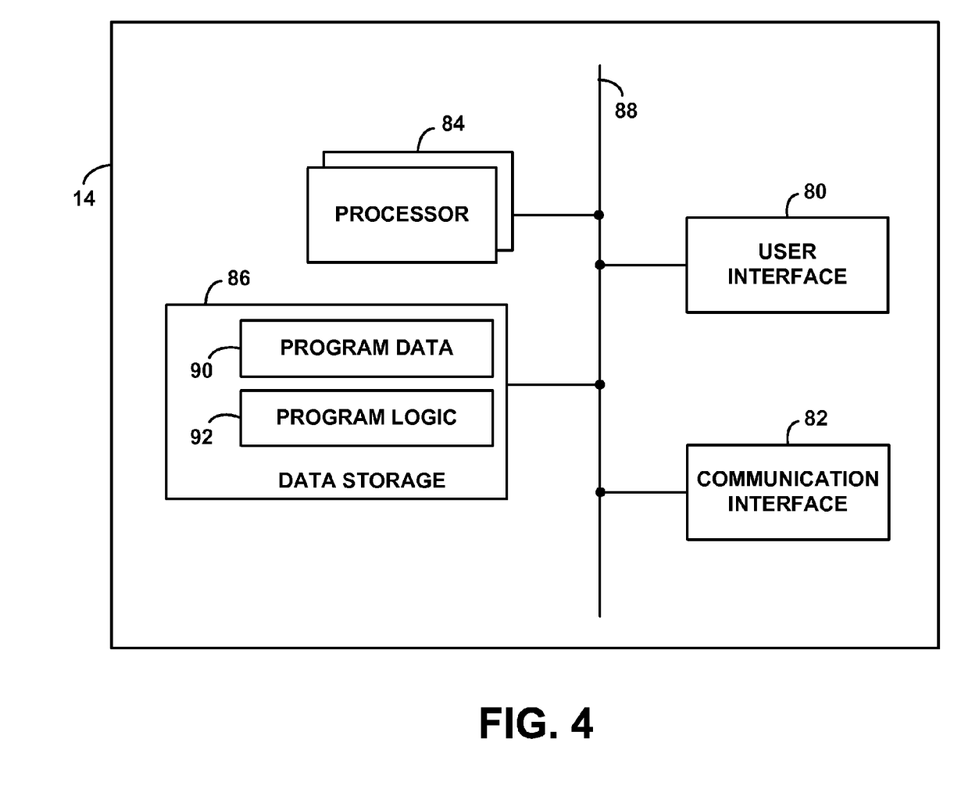
FIG. 4 is a simplified block diagram showing functional components of an exemplary access terminal capable of carrying out the exemplary methods of FIGS. 2-3.

FIG. 4 is a simplified block diagram showing functional components of an exemplary access terminal 14 capable of carrying out the exemplary methods of FIGS. 2-3. As shown in FIG. 4, the exemplary access terminal 14 may include a user interface 80, a communication interface 82, a processor 84, and data storage 86, all linked together via a system bus, network, or other connection mechanism 88. For purposes of illustration, the following description will assume that the exemplary access terminal 14 is located in a given coverage area.

Referring to FIG. 4, the user interface 80 preferably functions to facilitate user interaction with the exemplary access terminal 14. The user interface 80 may include a variety of input components, such as a touch screen, a navigation pad, a multi-functional button, a thumb wheel, a keyboard or keypad, and/or a microphone for instance. Additionally, the user interface 80 may include a variety of output components, such as a display screen and/or a speaker for instance. Additionally yet, the user interface 80 may include signal processing components, such as analog to digital (A-D) and digital to analog (D-A) circuitry. The user interface 80 may include other components for facilitating user interaction with the exemplary access terminal 14 as well.

The communication interface 82 preferably functions to communicatively couple the exemplary access terminal 14 to the access network 12, and more particularly the BTSs 20 of the access network 12. In this respect, the communication interface 82 will preferably facilitate forward-link and reverse-link communication with the access network 12. The communication interface 82 may take the form of an Ethernet network interface module, a chipset and antenna adapted to facilitate wireless communication according a desired protocol (e.g., IS-856 Rel. 0), and/or any other form that provides for wireless and/or wired communication. The communication interface 82 may also include multiple communication interfaces, such as one with which the exemplary access terminal 14 sends reverse-link communications and one with which the exemplary access terminal 14 receives forward-link communications. Other configurations are also possible.

The processor 84 may comprise one or more general purpose microprocessors and/or dedicated signal processors. (The term "processor" encompasses either a single processor or multiple processors that could work in combination.) Data storage 86, in turn, may comprise memory and/or other storage components, such as optical, magnetic, organic or other memory or disk/disc storage, which can be volatile and/or non-volatile, internal and/or external, and integrated in whole or in part with the processor 84. Data storage 86 preferably contains or is arranged to contain (i) program data 90 and (ii) program logic 92. Although these components are described herein as separate data storage elements, the elements could just as well be physically integrated together or distributed in various other ways. In a preferred example, the program data 90 would be maintained in data storage 86 separate from the program logic 92, for easy updating and reference by the program logic 92.

Program data 90 may contain information related to the given coverage area and/or its reverse link. For example, program data 90 may contain identifying information for the given coverage area and/or its reverse link (e.g., a PN offset and/or Walsh code). As another example, program data 90 may contain an indication of a level of loading on the given coverage area's reverse link, such as an indication of a series of RABs received from the access network 12. In this respect, the indication may represent the monitored level of loading during various different time windows, such as the last 16 forward-link timeslots for instance. As yet another example, program data 90 may contain other data indicative of the RF conditions of the given coverage area (e.g., SINR, C/I, etc.). Other examples are possible as well.

Program data 90 may also contain information related to reverse-link data rates at which the access terminal 14 transmits data. For example, program data 90 may contain an indication of the data rate at which the access terminal 14 is currently transmitting data. As another example, program data 90 may contain an indication of one or more data rates at which the access terminal 14 has previously transmitted data. In this respect, program data 90 will preferably include at least an indication of the reverse-link data rate at which the access terminal 14 last transmitted data. As yet another example, program data 90 may contain indications of the available reverse-link data rates at which the access terminal 14 can transmit data, including the minimum and maximum available reverse-link data rates. In this respect, program data 90 may also contain indications of probabilities that correspond to possible transitions between available reverse-link data rates. Other examples are possible as well.

Program data 90 may additionally contain information related to the access terminal's location. For example, program data 90 may contain an indication of the access terminal's current location (e.g., a coverage area from which the access terminal 14 is currently located or a geographic location of the access terminal 14). As another example, program data 90 may contain an indication of one or more previous locations of the access terminal 14 (e.g., one or more coverage areas in which the access terminal 14 was previously located or one or more previous geographic locations of the access terminal 14). In this respect, program data 90 will preferably include at least an indication of the location from which the access terminal 14 last transmitted data. Other examples are possible as well.

Program data 90 may further contain data for transmission to the access network 12. In this respect, the portion of the data storage 86 arranged to contain the data for transmission to the access network 12 may be referred to as the access network's data buffer.

Program logic 92 preferably comprises machine-language instructions that may be executed or interpreted by processor 84 to carry out functions in accordance with the exemplary methods described in FIGS. 2-3. It should be understood, however, that the program logic 92 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, the program logic 92 may be executable by the processor 84 for (a) monitoring a level of loading on the reverse link of the given coverage area, (b) detecting new data for transmission to the access network 12, and (c) in response to detecting the new data, selecting a reverse-link data rate based on the monitored level of loading and/or a location of the access terminal, and (d) beginning to transmit the new data to the access terminal at the selected reverse-link data rate. In one example, the selected rate with be either a first data rate (e.g., a reverse-link data rate at which the access terminal 14 last transmitted data) or a second data rate (e.g., a minimum available reverse-link data rate).

Exemplary embodiments have been described above. Those skilled in the art will understand, however, that changes and modifications may be made to the embodiments described without departing from the true scope and spirit of the present invention, which is defined by the claims.

We claim:

1. A method of transmitting data to an access network, the method being carried out by an access terminal in a given coverage area of the access network, the method comprising:
    the access terminal receiving a series of indicators of a level of loading on a reverse link of the given coverage area;
    the access terminal detecting new data for transmission to the access network;
    in response to detecting the new data, the access terminal selecting a reverse-link data rate by determining an average of the indicators received during a given time window and then (a) selecting a first data rate if the determined average does not exceed a threshold value or (b) selecting a second data rate if the determined average does exceed the threshold value, wherein the first data rate is higher than the second data rate; and
    the access terminal beginning to transmit the new data to the access network at the selected reverse-link data rate.

2. The method of claim 1, wherein the series of indicators of the level of loading on the reverse link of the given coverage area comprises a series of reverse activity bits (RABs) received from the access network.

3. The method of claim 1, wherein the first data rate comprises a reverse-link data rate at which the access terminal last transmitted data, and wherein the second data rate comprises a minimum available reverse-link data rate.

4. The method of claim 1, wherein the given time window comprises a last sixteen forward-link timeslots received by the access terminal before detecting the new data for transmission to the access network.

5. The method of claim 2, wherein the threshold value is 0.5.

6. The method of claim 1, further comprising:
    after beginning to transmit the new data, the access terminal adjusting the reverse-link data rate.

7. The method of claim 1, further comprising:
the access terminal completing transmission of the new data; and
in response to completing transmission of the new data, the access terminal storing a reverse-link data rate at which the access terminal last transmitted the new data.

8. A method of transmitting data to an access network, the method being carried out by an access terminal in a given coverage area of the access network, the method comprising:
the access terminal monitoring a level of loading on a reverse link of the given coverage area;
the access terminal detecting new data for transmission to the access network;
in response to detecting the new data, the access terminal selecting a reverse-link data rate based on the monitored level of loading and a comparison of a current location of the access terminal with a previous location of the access terminal; and
the access terminal beginning to transmit the new data to the access network at the selected reverse-link data rate.

9. The method of claim 8, wherein the access terminal monitoring the level of loading on the reverse link of the given coverage area comprises the access terminal monitoring a series of reverse activity bits (RABs) received from the access network.

10. The method of claim 9, wherein the access terminal selecting a reverse-link data rate based on the monitored level of loading and the comparison of the current location of the access terminal with the previous location of the access terminal comprises:
the access terminal determining an average of a series of RABs received during a given time window; and
the access terminal selecting a first data rate if the determined average is less than a threshold value and the current location is less than a predefined distance from the previous location; otherwise, the access terminal selecting a second data rate, wherein the second data rate is lower than the first data rate.

11. The method of claim 10, wherein the first data rate comprises a reverse-link data rate at which the access terminal last transmitted data, and wherein the second data rate comprises a minimum available reverse-link data rate.

12. The method of claim 8, where the current location comprises the given coverage area, and wherein the previous location comprises a coverage area from which the access terminal last transmitted data.

13. The method of claim 10, wherein the given time window comprises a last sixteen forward-link timeslots received by the access terminal before detecting the new data for transmission to the access network.

14. The method of claim 10, wherein the threshold value is 0.5.

15. The method of claim 8, further comprising:
the access terminal storing an indication of the monitored level of loading.

16. The method of claim 8, further comprising:
the access terminal completing transmission of the new data; and
in response to completing the transmission, the access terminal (a) storing an indication of a reverse-link data rate at which the access terminal last transmitted the new data and (b) storing an indication of a location from which the access terminal last transmitted the new data.

17. An access terminal comprising:
a communication interface for communicating with an access network;
a processor;
data storage, where the data storage includes a data buffer arranged to contain data for transmission to the access network; and
program instructions stored in the data storage and executable by the processor for:
receiving a series of indicators of a level of loading on a reverse link of the given coverage area;
detecting new data in the data buffer;
in response to detecting the new data, selecting a reverse-link data rate by determining an average of the indicators received during a given time window and then (a) selecting a first data rate if the determined average does not exceed a threshold value or (b) selecting a second data rate if the determined average does exceed the threshold value, wherein the first data rate is higher than the second data rate; and
beginning to transmit the new data, via the communication interface, to the access network at the selected reverse-link data rate.

18. The access terminal of claim 17, wherein the series of indicators of the level of loading on the reverse link of the given coverage area comprises a series of reverse activity bits (RABs) sent by the access network.

\* \* \* \* \*